(12) United States Patent
Clark et al.

(10) Patent No.: US 7,770,054 B2
(45) Date of Patent: Aug. 3, 2010

(54) APPARATUS, SYSTEM, AND METHOD TO PREVENT QUEUE STALLING

(75) Inventors: Brian Dow Clark, Tucson, AZ (US); Juan Alonso Coronado, Tucson, AZ (US); Dinh Hai Le, Tucson, AZ (US); Beth Ann Peterson, Tucson, AZ (US); Clarisa Valencia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 11/969,187

(22) Filed: Jan. 3, 2008

(65) Prior Publication Data
US 2009/0177911 A1 Jul. 9, 2009

(51) Int. Cl.
*G06F 11/00* (2006.01)
(52) U.S. Cl. .................. 714/4; 710/52; 710/54
(58) Field of Classification Search .............. 714/3, 714/4, 43; 710/52, 54, 112, 310; 370/229
See application file for complete search history.

(56) References Cited

U.S. PATENT DOCUMENTS

| | | | |
|---|---|---|---|
| 5,420,988 A | | 5/1995 | Elliott .................. 395/275 |
| 6,792,482 B2 * | | 9/2004 | Iwatani et al. .............. 710/39 |
| 6,950,886 B1 * | | 9/2005 | Bailey ..................... 710/52 |
| 7,054,987 B1 * | | 5/2006 | Reed et al. .................. 710/310 |
| 7,281,169 B2 * | | 10/2007 | Golasky et al. ............... 714/43 |
| 7,657,672 B2 * | | 2/2010 | Kampmann et al. ........... 710/52 |
| 2006/0106964 A1 | | 5/2006 | Clark et al. ................ 710/200 |
| 2006/0136789 A1 * | | 6/2006 | Oshida ....................... 714/43 |
| 2006/0190641 A1 | | 8/2006 | Routliffe et al. ............. 710/52 |
| 2007/0291647 A1 * | | 12/2007 | Smith et al. ................ 370/237 |
| 2009/0063735 A1 * | | 3/2009 | Ng et al. .................... 710/54 |

OTHER PUBLICATIONS

Feeney, JW et al., "No-Op Commands for Re-Ordering Messages in a First In/First Out", IBM Technical Bulletin Disclosure, vol. 37, No. 12, Dec. 1994, pp. 203-206.

* cited by examiner

*Primary Examiner*—Marc Duncan
(74) *Attorney, Agent, or Firm*—Kunzler Needham Massey & Thorpe (57) ABSTRACT

An apparatus, system, and method are disclosed to prevent queue stalling. The apparatus to prevent queue stalling is provided with a plurality of modules configured to functionally execute the necessary steps of detecting a connection failure on a first logical path, wherein the first logical path is associated with a first entry in a queue, and wherein the first logical path is configured to define a communication path between an entity associated with a first entry in the queue and a queue manager, scanning the queue to identify a second entry associated with a second logical path in response to the connection failure, and advancing the second entry to a position within the queue that is ahead of the first entry. These modules in the described embodiments include a detection module, a scanning module, and an advancing module.

20 Claims, 6 Drawing Sheets

APPARATUS, SYSTEM, AND METHOD TO PREVENT QUEUE STALLING

BACKGROUND OF THE INVENTION

1. Field of the Invention

This invention relates to queue management and more particularly relates to an apparatus, system, and method to prevent queue stalling.

2. Description of the Related Art

In distributed computing environments, application hosts typically communicate with a storage controller to store application data remotely. Centralized data storage allows for consolidated backup and restore processes, which generally improve data reliability and accessibility. Additionally, a larger amount of data can typically be stored on several storage volumes associated with a typical storage controller.

In such systems, a single storage controller manages storage of data for multiple application hosts. The various application hosts may communicate with the storage controller via various physical paths. As used herein, the term "physical path" includes a series of hardware devices, cables, wireless connections, and the like for communication of physical data signals from a first device to a second device. For example, a first application server may communicate with a storage controller via multiple router and cable connections in a data network. A second application server, located remotely from the first application server may communicate with the storage controller via an entirely separate set of router and cable connections. Thus, in such systems, there are generally multiple physical paths to the same storage controller.

Physical paths are often described by logical paths. As used herein, the term "logical path" means a virtual representation of the physical path, including a series of device addresses and/or names that define a physical path between a first device and a second device. The logical path may be referenced by a first device to determine a series of devices through which to communicate a data signal to a second device.

In a typical network, an application server may send an access request or Input/Output (I/O) request to a storage controller in order to establish a connection for accessing data on a storage volume managed by the storage controller. However, in a large system, the storage controller may receive multiple requests from various different application servers at substantially the same time, or at least while the storage server is still busy processing a request that was previously received. In this type of situation, the storage controller typically establishes a queue for managing the multiple access requests.

The queue is generally characterized as an array of Task Control Blocks (TCBs), where each TCB is a data structure containing data that characterizes the request. Each TCB often contains a pointer to a logical path associated with the application server that generated the access request. The logical path is typically represented by a data structure that is stored on the storage controller. The data structure defining the logical path between the application server and the storage controller is typically generated automatically during a handshake process between the application server and the storage controller that takes place when the application server is booting up. The logical path data structure generally simplifies subsequent communications between the application server and the storage controller.

One problem that commonly arises is that the execution of a queue request is stalled by a connection failure between the application server and the storage controller. In this case, the entire queue of requests is typically stalled or jammed by the failure. The failure typically arises from an error reading the logical path information, a physical connection failure, or the like. In one specific example, a hard failure may be caused by an unplugged cable along one of the physical paths.

Although the example of application server and storage controller has been described in this description for illustrative purposes only, it should remain clear that this disclosure may be applicable to various other devices and combinations of devices. This background section is not intended to limit the scope of the present invention in any way, nor is the background intended to provide any objects, motivations, or limiting features of the claimed subject matter. Rather, the background is intended to provide a single example for contextual simplification of the description, and to improve the reader's ability to comprehend the specification.

SUMMARY OF THE INVENTION

The present invention has been developed in response to the present state of the art, and in particular, in response to the problems and needs in the art that have not yet been fully solved by currently available queue management solutions. Accordingly, the present invention has been developed to provide an apparatus, system, and method to prevent queue stalling that overcome many or all of the above-discussed shortcomings in the art.

The apparatus to prevent queue stalling is provided with a plurality of modules configured to functionally execute the necessary steps of detecting a connection failure on a first logical path, wherein the first logical path is associated with a first entry in a queue, and wherein the first logical path is configured to define a communication path between an entity associated with a first entry in the queue and a queue manager, scanning the queue to identify a second entry associated with a second logical path in response to the connection failure, and advancing the second entry to a position within the queue that is ahead of the first entry. These modules in the described embodiments include a detection module, a scanning module, and an advancing module.

A system of the present invention is also presented to prevent queue stalling. In one embodiment, the system includes one or more entities configured to communicate a request for access to an accessible resource on a remote device over a predetermined logical path. The system may also include a remote device comprising an accessible resource. The remote device may receive one or more requests for access to the accessible resource from the one or more entities in communication with the remote device, wherein the one or more requests for access to the accessible resource are represented by one or more entries in a queue of entries on the remote device. Additionally, the system may include a queue manager associated with the remote device. The queue manager may be configured to detect a connection failure on a first logical path, wherein the first logical path is associated with a first entry in a queue, and wherein the first logical path is configured to define a communication path between an entity associated with a first entry in the queue and a queue manager, scan the queue to identify a second entry associated with a second logical path in response to the connection failure, and advance the second entry to a position within the queue that is ahead of the first entry.

A method of the present invention is also presented to prevent queue stalling. The method in the disclosed embodiments substantially includes the steps necessary to carry out the functions presented above with respect to the operation of the described apparatus and system. In one embodiment, the method includes sending a reconnect request from the queue manager to the entity associated with the first entry on the logical path identified by the first entry, waiting a predetermined period of time for the entity associated with the first entry to send a reply to the queue manager on the logical path identified by the first entry, and indicating a time-out condition in response to a determination that the predetermined period of time has elapsed and that the queue manager has not received a reply from the entity associated with the first entry.

In a further embodiment, detecting a connection failure on the first logical path may also include sending a reconnect request from the queue manager to the entity associated with the first entry on the logical path identified by the first entry, waiting a predetermined period of time for the entity associated with the first entry to send a reply to the queue manager on the logical path identified by the first entry, and indicating a time-out condition in response to a determination that the predetermined period of time has elapsed and that the queue manager has not received a reply from the entity associated with the first entry. Additionally the method may include deleting the first entry from the queue in response to a determination that a predetermined number of attempts to establish a connection between entity associated with the first entry and the queue manager on the first logical path have failed.

In one embodiment, the method may include referencing a data structure associated with each logical path to obtain information required to establish a connection between the queue manager and an entity associated with an entry in the queue. An entry in the queue may additionally include a Task Control Block (TCB) containing a pointer to the data structure associated with the logical path designated for that entry in the queue.

In a particular embodiment, scanning the queue for a second entry associated with a second logical path includes comparing the pointer in the TCB of each entry in the queue with the pointer in the TCB for the first entry, until an entry with a pointer that is different from the pointer associated with the first entry is identified. Additionally, advancing may further include moving the second entry to the first position in the queue, and pushing the first entry back to the second position in the queue.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
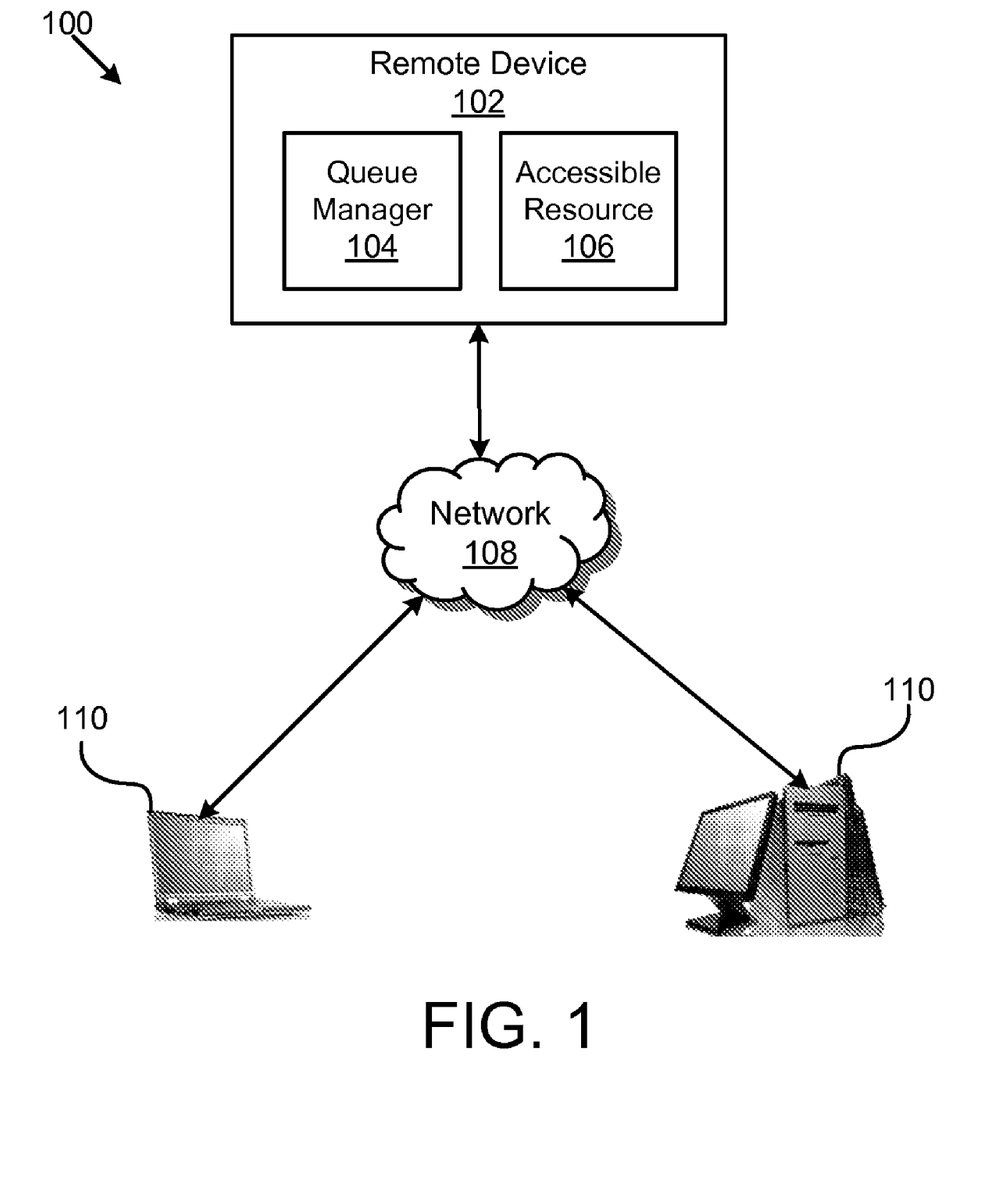
FIG. 1 is a schematic block diagram illustrating one embodiment of a system to prevent queue stalling.

FIG. 1 depicts one embodiment of a system 100 to prevent queue stalling. In the depicted embodiment, the system 100 includes one or more entities 110 configured to communicate with a remote device 102 via a network 108. In one embodiment, the remote device 102 includes a queue manager 104 and an accessible resource 106. The entities 110 may request access to the accessible resource 106 via a physical communication path (not numbered). The physical communication path to the remote device 102 may be different for each entity 110.

If the remote device 102 receives multiple requests to access the accessible resource 106, the queue manager 104 may establish a request queue (not shown). The request queue is described further with reference to FIG. 3 and specifically depicted as illustrated item number 302. For simplification, the queue managed by the queue manager 104 shall be referred to, from this point forward, as the "queue 302."

In one embodiment, the remote device 102 may include a storage controller or storage server. In one specific embodiment, the remote device 102 is a model DS8000™ storage controller available from International Business Machines (IBM®). In an alternative embodiment, the remote device 102 may include tape storage device, a processor, a web server, or the like. In such embodiments, the remote device 102 may include an accessible resource 106 such as a storage volume, a processor, an application, a web resource, or the like. The remote device 102 may act as a gateway to the accessible resource 106, controlling access requests from various entities 110 on the network 108.

An entity 110 may include a laptop or desktop computer, a server, an application host, or the like. For example, the entity 110 may include a laptop configured to run a web browser. When the user accesses a specified web page or application, the entity 110 may request access to a web service hosted by a remote device 102. Google™ provides one such page configured to access multiple web services hosted by remote web servers 102. If the web server 102 receives multiple requests for the web service, a queue manager 104 may queue the requests until they can be processed.

The network 108 may include networking devices such as routers, switches, and hubs. Additionally, the network 108 may include cables and wireless interfaces configured to communicate information between multiple network devices. In one embodiment, the network 108 is a Local Area Network (LAN). Alternatively, the network 108 may include a Wide Area Network (WAN) or a Storage Area Network (SAN).

Figure 2:
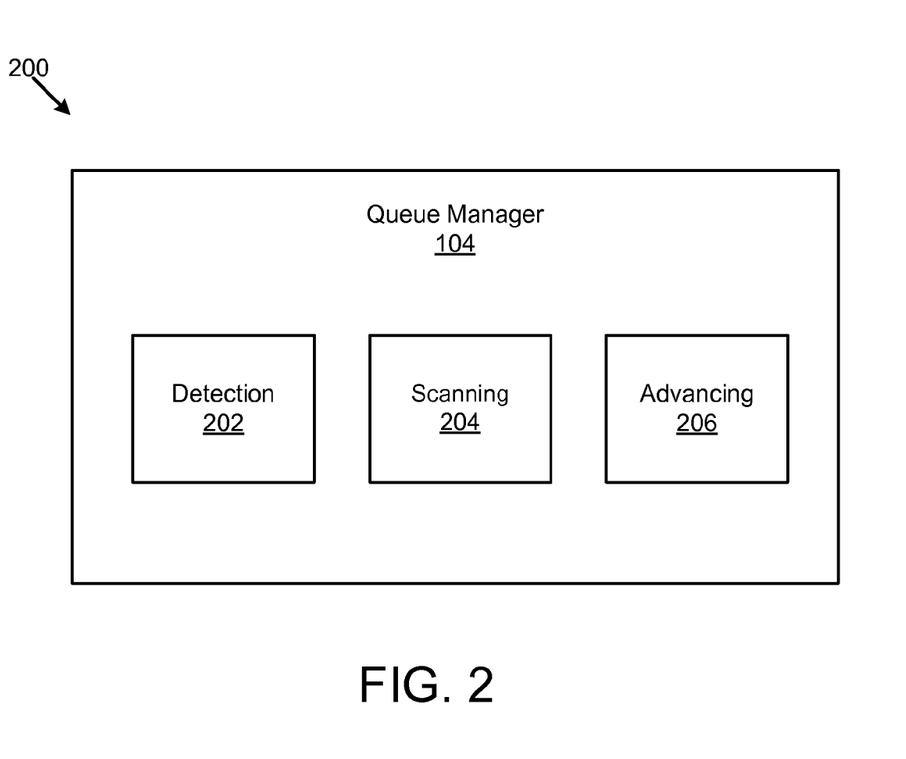
FIG. 2 is a schematic block diagram illustrating one embodiment of an apparatus to prevent queue stalling.

FIG. 2 illustrates on embodiment of an apparatus 200 to prevent queue stalling. In the depicted embodiment, the apparatus 200 includes the queue manager 104. The queue manager 104 may include a detection module 202, a scanning module 204, and an advancing module 206. Additionally, the queue manager 104 may include the queue 302 (not shown). In various further embodiments, the queue manager 104 may include additional modules, including I/O interfaces, memory, and standard queue management modules not described herein.

In one embodiment, the detection module 202 may detect a connection failure on a first logical path. The first logical path may define a communication path between an entity 110 associated with a first entry in the queue 302 and the queue manager 104 or the remote device 102. In one embodiment, the detection module 202 may be implemented in hardware, including various combinations of resistors, capacitors, transistors, and the like. Alternatively, the detection module 202 may be implemented in firmware configured to run on a programmable hardware device such as an FPGA, programmable gate array, or the like. In still another embodiment, the detection module 202 may be implemented in software configured to run in conjunction with an operating system on a computer processor. Further embodiments of the detection module are described below with reference to FIGS. 4 and 5.

In a further embodiment, once a new queue entry comes to the top of a First In First Out (FIFO) queue, the detection module 202 may send a reconnect request from the queue manager 104 to the entity 110 associated with that entry. Specifically, the detection module 202 may send the reconnect request along the logical path identified by that entry. The detection module 202 may then wait for a response from the entity 110. In a certain embodiment, the detection module 202 will only wait for a predetermined time period before indicating a time-out condition. In a certain further embodiment, the queue manager 104 may delete the entry if a time-out is indicated. Alternatively, the queue manager 104 may delete the entry if a predetermined number of attempts to reconnect with the entity 110 have failed.

In response to a connection failure identified by the detection module 202, the scanning module 204 may scan entries in the queue to identify a second entry that is associated with a different logical path than the stalled entity is associated with. In particular, the scanning module 204 may scan up to the entire queue until an entry associated to a logical path that is not the logical path associated with the stalled queue entry is identified. In one embodiment, the scanning module 204 may include software or firmware code configured to loop through the entries in the queue. The scanning module 204 may compare certain aspects of the queue entries that indicate an associated logical path to determine whether the queue entries point to the same logical path. Further examples of the functionality of the scanning module 204 are discussed in further detail below with reference to FIGS. 3 and 6.

Once the scanning module 204 identifies a queue entry that points to a different logical path than the stalled queue entry, the advancing module 206 may move the identified queue entry to a position within the queue that is ahead of the first queue entry. In one specific embodiment, the advancing module 206 may move the second queue entry to the top of the queue, pushing the first queue entry back to the second position in the queue, so that the second queue entry is executed before a second attempt to execute the first queue entry. The advancing module 206 may include a software module configured to perform various array ordering and management operations such as moving and deleting array entries. Additionally, the advancing module 206 may include a buffer configured to hold queue entries during a move operation.

Figure 3:
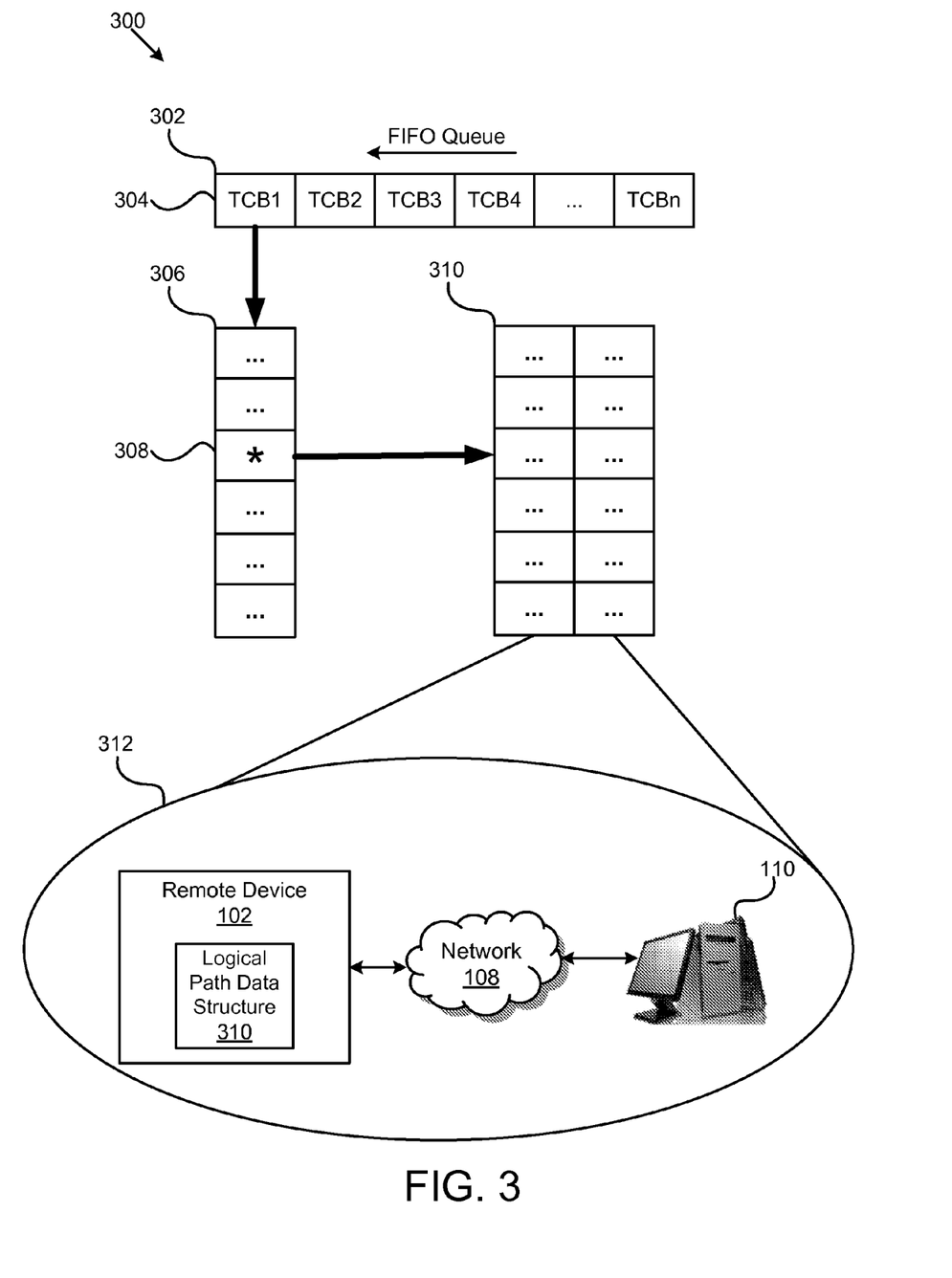
FIG. 3 is a logical diagram illustrating one embodiment of a relationship between an entry in a queue and a physical communication path associated with that entry.

FIG. 3 is a logical diagram illustrating one embodiment of a relationship between an entry 304 in a queue 302 and a physical communication path 312 associated with that entry 304. In the depicted embodiment, the queue 302 is a FIFO stack or array. The queue 302 may include one or more entries 304. In the depicted embodiment, the entries 304 include a TCB 306 configured to store information associated with the request to access the accessible resource 106.

In a further embodiment, each entry 304 in the queue 302 includes a TCB 306. Each TCB may include a data structure or array as illustrated. In the depicted embodiment, each TCB 306 includes a pointer 308. The pointer 308 may point to a location on the remote device 102 where a logical path data structure 310 is stored. In such an embodiment, each TCB 304 may point to information defining the logical path to be used for communications between the entity 110 requesting access to the accessible resource 106 and the remote device 102. As depicted, the logical path data structure 310 may contain logical information associated with an actual physical path 312 defined by the hardware and software connections between the devices 102, 110.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
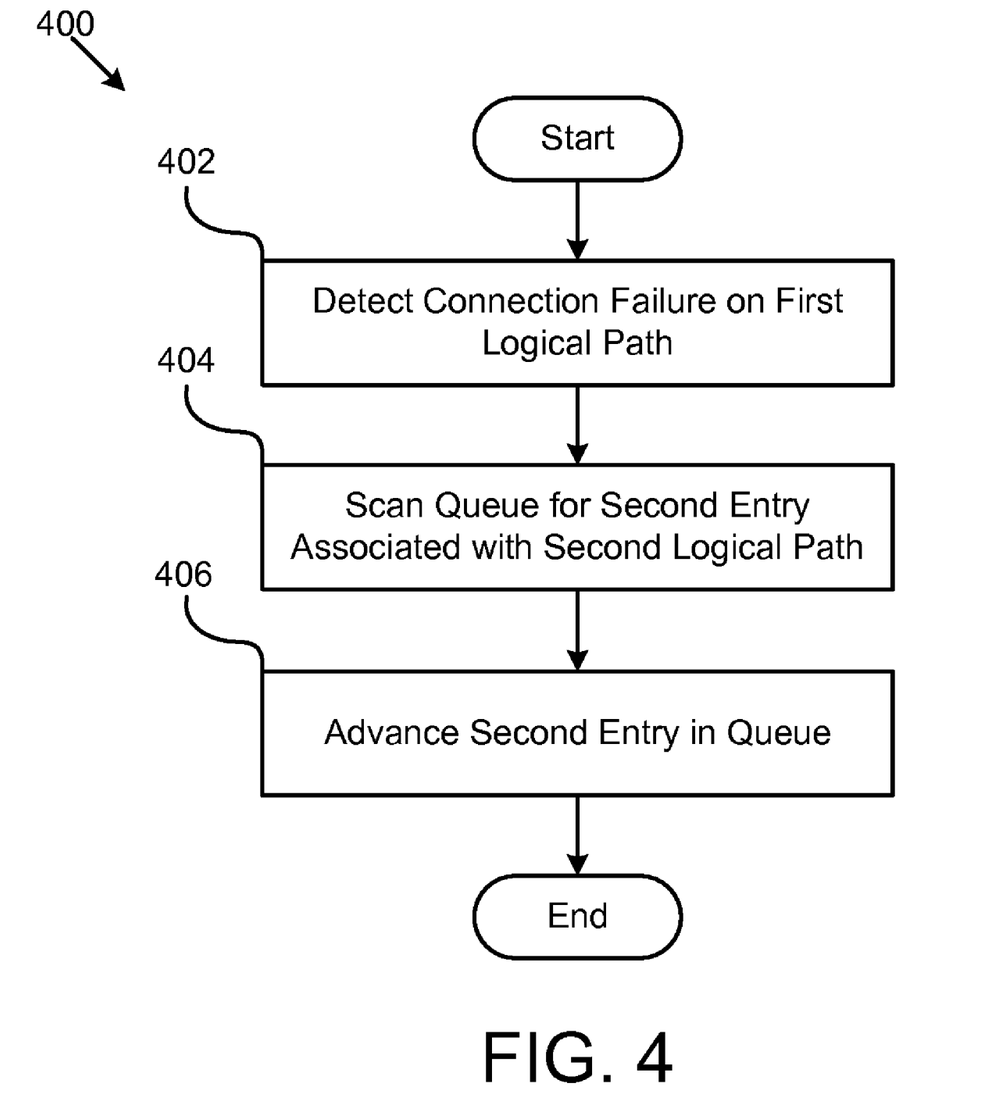
FIG. 4 is a schematic flow chart diagram illustrating one embodiment of a method to prevent queue stalling.

FIG. 4 illustrates one embodiment of a method 400 to prevent the queue 302 from stalling. In one embodiment, the method 400 starts when the detection module 202 detects 402 a connection failure between an entity 110 requesting access to the accessible resource 106 and the remote device 102.

The scanning module 204 may then scan 404 the queue 302 for a second entry 304. The scan 404 may include comparing the pointer 308 in each TCB 306 associated with each entry 304 in the queue with the pointer 308 in the TCB 306 associated with the stalled entry 304. If the pointers 308 are different, indicating that the logical paths are different, the entry 304 may by identified as the second entry 304.

The advancing module 206 may then advance 406 the second entry 304 to the top of the queue 302. In a further embodiment, the advancing module 206 may push the first entry 304 to the second position in the queue 302, and the method 400 ends.

In one exemplary embodiment, an application server 110 may request access to a storage volume 106 managed by a storage controller 102. The access request may be queued in a queue 302 of entries 304 representing the access requests. When an entry 304 reaches the top of the queue, the detection module 202 may detect 402 a connection error on the logical path designated between the application server 110 and the storage controller 102.

The scanning module 204 may then scan 404 the queue 302 for an entry 304 that does not have the same pointer 308 as the pointer 308 that points to the location of the logical path data structure 310 associated with the stalled entry 304. The scanning module 204 may scan 404 the entire queue 302 until a second entry 304 is identified.

The advancing module 206 may then advance 406 the second entry 304 to the top of the queue 302 and the second entry 304 may be executed by attempting to establish a connection between the storage controller 102 and another requesting entity 110 along a different logical path.

Figure 5:
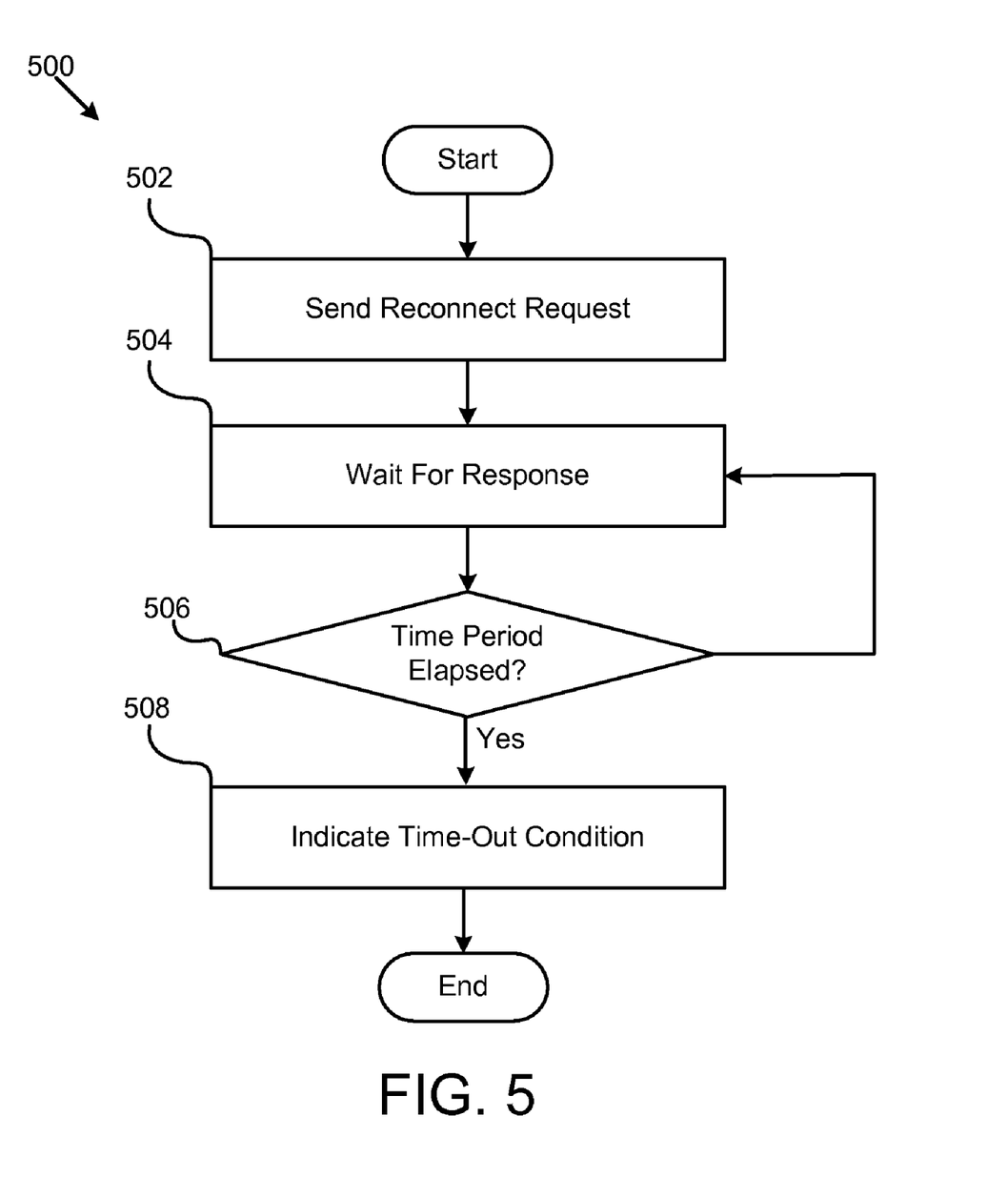
FIG. 5 is a schematic flow chart diagram illustrating one embodiment of a method to detect a stall condition in a queue.

FIG. 5 illustrates a further embodiment of a method 500 for detecting 402 a connection failure. In the depicted embodiment, the method 500 starts when the remote device 102 sends 502 a reconnect request to a requesting entity 110 along a path 312 designated by a logical path data structure 310. The remote device 102 may then wait 504 for a response from the requesting device 110. If a predetermined time period elapses 506 and no response has been received, the detection module 202 may indicate 508 a time-out condition, indicating 508 that there has been a connection failure along the designated path 312.

Figure 6:
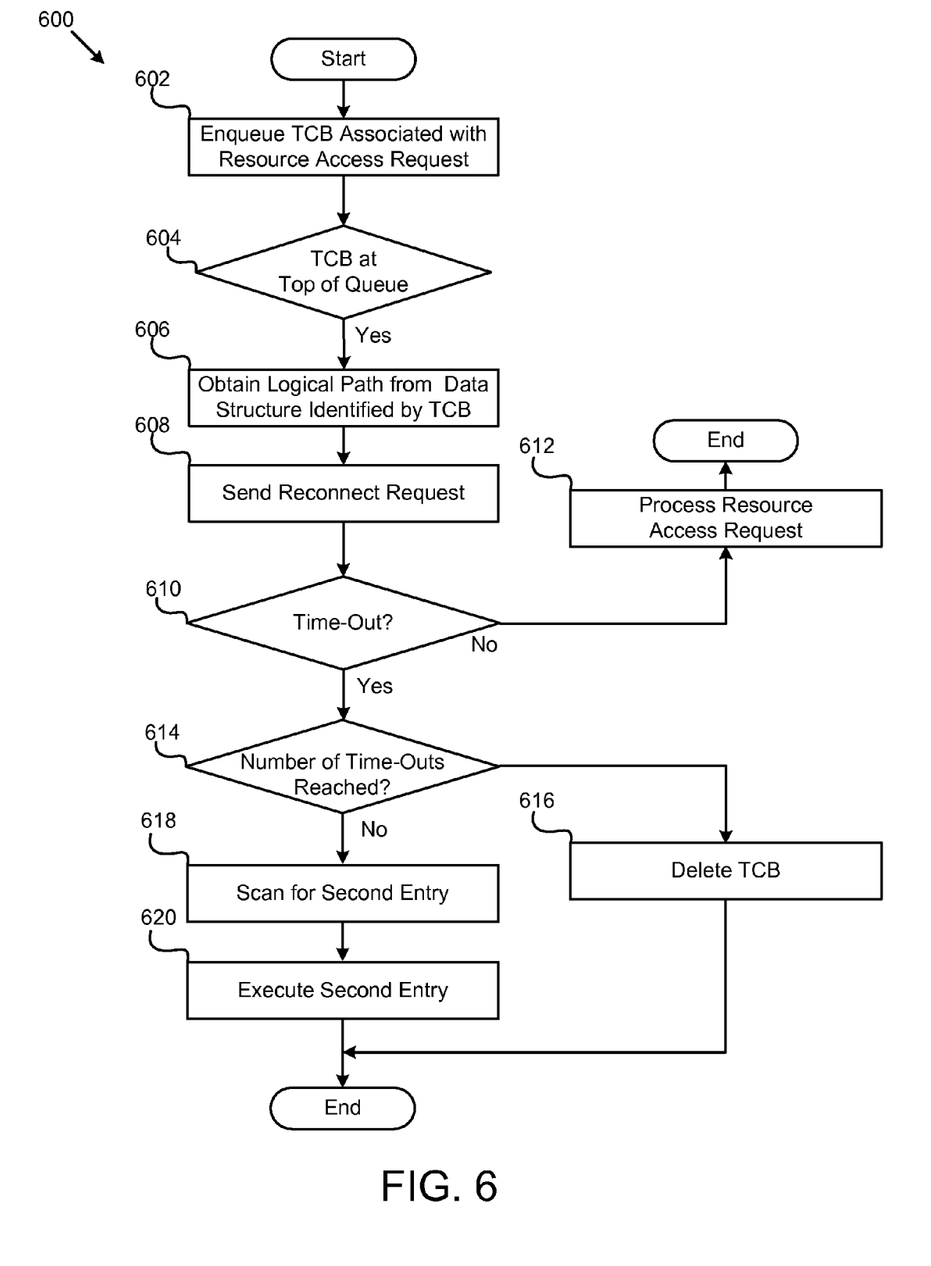
FIG. 6 is a detailed schematic flow chart diagram illustrating one embodiment of a method to prevent queue stalling.

FIG. 6 illustrates a detailed embodiment of a method 600 to prevent queue stalling. In the depicted embodiment, the method 600 starts when the remote device 102 enqueues 602 a TCB 306 associated with a resource access request received by the remote device 102 from a requesting entity 110. If the remote device 102 determines 604 that the TCB is at the top of the queue 302, the remote device 102 may obtain 606 logical path data from the logical path data structure 310 designated by the pointer 308 in the TCB 306.

The detection module 202 may then send 608 a reconnect request to the requesting entity 110. If the detection module 202 does not identify 610 a time-out condition, but receives a response from the requesting device 110, then the remote device 102 may process 612 the access request. However, if the detection module 202 does identify a time-out condition, the queue manager 104 may then determine 614 whether a time-out condition has been indicated a predetermined number of times for that queue entry 304. If so, the queue manager 104 may delete 616 the queue entry 304 by deleting the TCB 306 from the queue 302.

If the predetermined number of time-outs has not been reached 614, the scanning module 204 may then scan 618 the queue 302 for a second entry 304 that points to a logical path data structure 310 that is different from the logical path data structure 310 pointed to by the first entry 304. Once the scanning module 618 identifies the second entry 304, the advancing module 206 may advance the second entry 304 to the top of the queue 302 and execute 620 the second entry 304 by following this same process. Once all of the queue entries 304 have been deleted from the queue 302 or successfully processed, the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method to prevent queue stalling, the method comprising:

detecting a connection failure on a first logical path, wherein the first logical path is associated with a first entry in a queue, and wherein the first logical path is configured to define a communication path between an entity associated with a first entry in the queue and a queue manager;

scanning the queue to identify a second entry associated with a second logical path in response to the connection failure; and advancing the second entry to a position within the queue that is ahead of the first entry.

2. The method of claim 1, wherein detecting a connection failure on the first logical path further comprises:

sending a reconnect request from the queue manager to the entity associated with the first entry on the logical path identified by the first entry;

waiting a predetermined period of time for the entity associated with the first entry to send a reply to the queue manager on the logical path identified by the first entry; and indicating a time-out condition in response to a determination that the predetermined period of time has elapsed and that the queue manager has not received a reply from the entity associated with the first entry.

3. The method of claim 2, further comprising deleting the first entry from the queue in response to a determination that a predetermined number of attempts to establish a connection between entity associated with the first entry and the queue manager on the first logical path have failed.

4. The method of claim 1, wherein the method further comprises referencing a data structure associated with each logical path to obtain information required to establish a connection between the queue manager and an entity associated with an entry in the queue.

5. The method of claim 4, wherein an entry in the queue further comprises a Task Control Block (TCB) containing a pointer to the data structure associated with the logical path designated for that entry in the queue.

6. The method of claim 5, wherein scanning the queue for a second entry associated with a second logical path further comprises comparing the pointer in the TCB of each entry in the queue with the pointer in the TCB for the first entry, until an entry with a pointer that is different from the pointer associated with the first entry is identified.

7. The method of claim 1, wherein advancing further comprising:

moving the second entry to the first position in the queue; and pushing the first entry back to the second position in the queue.

8. A computer program product comprising a computer readable medium having computer usable program code executable to perform operations to prevent queue stalling, the operations of the computer program product comprising:

detecting a connection failure on a first logical path, wherein the first logical path is associated with a first entry in a queue, and wherein the first logical path is configured to define a communication path between an entity associated with a first entry in the queue and a queue manager;

scanning the queue to identify a second entry associated with a second logical path in response to the connection failure; and advancing the second entry to a position within the queue that is ahead of the first entry.

9. The computer program product of claim 8, wherein detecting a connection failure on the first logical path further comprises:

sending a reconnect request from the queue manager to the entity associated with the first entry on the logical path identified by the first entry;

waiting a predetermined period of time for the entity associated with the first entry to send a reply to the queue manager on the logical path identified by the first entry; and indicating a time-out condition in response to a determination that the predetermined period of time has elapsed and that the queue manager has not received a reply from the entity associated with the first entry.

10. The computer program product of claim 9, further comprising deleting the first entry from the queue in response to a determination that a predetermined number of attempts to establish a connection between entity associated with the first entry and the queue manager on the first logical path have failed.

11. The computer program product of claim 8, wherein the operations further comprise referencing a data structure associated with each logical path to obtain information required to establish a connection between the queue manager and an entity associated with an entry in the queue.

12. The computer program product of claim 11, wherein an entry in the queue further comprises a Task Control Block (TCB) containing a pointer to the data structure associated with the logical path designated for that entry in the queue.

13. The computer program product of claim 12, wherein scanning the queue for a second entry associated with a second logical path further comprises comparing the pointer in the TCB of each entry in the queue with the pointer in the TCB for the first entry, until an entry with a pointer that is different from the pointer associated with the first entry is identified.

14. The computer program product of claim 8, wherein the advancing operation further comprises:

moving the second entry to the first position in the queue; and pushing the first entry back to the second position in the queue.

15. A system to prevent queue stalling, the system comprising:

one or more entities configured to communicate a request for access to an accessible resource on a remote device over a predetermined logical path;

a remote device comprising an accessible resource, the remote device configured to receive one or more requests for access to the accessible resource from the one or more entities in communication with the remote device, wherein the one or more requests for access to the accessible resource are represented by one or more entries in a queue of entries on the remote device; and a queue manager associated with the remote device, the queue manager configured to:

detect a connection failure on a first logical path, wherein the first logical path is associated with a first entry in a queue, and wherein the first logical path is configured to define a communication path between an entity associated with a first entry in the queue and a queue manager;

scan the queue to identify a second entry associated with a second logical path in response to the connection failure; and advance the second entry to a position within the queue that is ahead of the first entry.

16. The system of claim 15, wherein queue manager is further configured to:
- send a reconnect request from the queue manager to the entity associated with the first entry on the logical path identified by the first entry;
- wait a predetermined period of time for the entity associated with the first entry to send a reply to the queue manager on the logical path identified by the first entry; and
- indicate a time-out condition in response to a determination that the predetermined period of time has elapsed and that the queue manager has not received a reply from the entity associated with the first entry.

17. The system of claim 16, further comprising deleting the first entry from the queue in response to a determination that a predetermined number of attempts to establish a connection between entity associated with the first entry and the queue manager on the first logical path have failed.

18. The system of claim 15, wherein the queue manager is further configured to:
- reference a data structure associated with each logical path to obtain information required to establish a connection between the queue manager and an entity associated with an entry in the queue, wherein an entry in the queue further comprises a Task Control Block (TCB) containing a pointer to the data structure associated with the logical path designated for that entry in the queue; and
- compare the pointer in the TCB of each entry in the queue with the pointer in the TCB for the first entry, until an entry with a pointer that is different from the pointer associated with the first entry is identified.

19. The system of claim 15, wherein the queue manager is further configured to:
- move the second entry to the first position in the queue; and
- push the first entry back to the second position in the queue.

20. An apparatus to prevent queue stalling, the apparatus comprising:
- a detection module configured to detect a connection failure on a first logical path, wherein the first logical path is associated with a first entry in a queue, and wherein the first logical path is configured to define a communication path between an entity associated with a first entry in the queue and a queue manager;
- a scanning module in communication with the detection module, the scanning module configured to scan the queue to identify a second entry associated with a second logical path in response to the connection failure; and
- an advancing module configured to advance the second entry to a position within the queue that is ahead of the first entry.

* * * * *